(12) United States Patent
Erlebacher et al.

(10) Patent No.: US 6,805,972 B2
(45) Date of Patent: Oct. 19, 2004

(54) METHOD OF FORMING NANOPOROUS MEMBRANES

(75) Inventors: Jonah Erlebacher, Chevy Chase, MD (US); Yi Ding, Balitmore, MD (US)

(73) Assignee: Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/386,924

(22) Filed: Mar. 13, 2003

(65) Prior Publication Data

US 2004/0040416 A1 Mar. 4, 2004

Related U.S. Application Data

(60) Provisional application No. 60/406,065, filed on Aug. 27, 2002.

(51) Int. Cl.[7] .............................. G32B 3/24; G25F 3/02; G25F 3/14
(52) U.S. Cl. ........................ 428/613; 428/606; 216/56; 216/100; 205/656; 205/665
(58) Field of Search ................................ 428/613, 687, 428/606; 216/56, 100; 205/656, 665

(56) References Cited

U.S. PATENT DOCUMENTS

| | | | | |
|---|---|---|---|---|
| 3,486,928 A | | 12/1969 | Rhoda et al. ................ 117/130 |
| 4,255,247 A | * | 3/1981 | Oda et al. .................... 204/293 |
| 4,713,234 A | * | 12/1987 | Weirich et al. ........... 423/648.1 |
| 4,801,379 A | * | 1/1989 | Ehrsam et al. .............. 210/498 |
| 4,857,080 A | * | 8/1989 | Baker et al. .................... 95/56 |
| 4,977,038 A | | 12/1990 | Sieradzki et al. ............ 428/610 |
| 5,753,014 A | * | 5/1998 | Van Rijn ....................... 96/12 |
| 5,830,680 A | * | 11/1998 | Meyerhoff et al. ......... 435/7.92 |
| 6,060,190 A | | 5/2000 | Campbell et al. ............. 429/40 |
| 6,391,477 B1 | | 5/2002 | Koslov et al. .............. 428/670 |
| 2002/0020298 A1 | * | 2/2002 | Drost et al. .................... 96/11 |
| 2002/0028345 A1 | * | 3/2002 | Kempf et al. ............... 428/670 |

FOREIGN PATENT DOCUMENTS

| | | | |
|---|---|---|---|
| JP | 48-44699 | * | 6/1978 |
| JP | 57-109242 | * | 7/1982 |
| JP | 61-259722 | * | 11/1986 |
| JP | 64-070135 | * | 3/1989 |

OTHER PUBLICATIONS

J. Erlebacher et al., "Evolution of nanoporosity in dealloying," Nature, vol. 410, Mar. 22, 2001, pp. 450–453.

* cited by examiner

Primary Examiner—John J. Zimmerman
(74) Attorney, Agent, or Firm—Fleshner & Kim, LLP (57) ABSTRACT

The present invention is directed to nanoporous metal membranes and methods of making nanoporous metal membranes from metal leaf. At least a portion of the metal leaf is freely supported by a de-alloying medium for a time effective to de-alloy the metal leaf. After the porous membrane is formed, the membrane may be re-adhered to a substrate and removed from the de-alloying medium. The de-alloying process may be thermally and electrically influenced.

67 Claims, 8 Drawing Sheets

METHOD OF FORMING NANOPOROUS MEMBRANES

This application claims priority to U.S. Provisional Appln. No. 60/406,065, filed Aug. 27, 2002, whose entire disclosure is incorporated herein by reference.

BACKGROUND OF THE INVENTION

This application is related to U.S. application Ser. No. 10/467,436, Titled: Method of Plating Metal Leafs and Metal Membranes, by Jonah ERLEBACHER,et al., filed on Aug. 26. 2003, which is incorporated by reference herein in its entirety.

1. Field of the Invention

The invention relates to methods for forming porous structures, and in particular to de-alloying metal leaf to form nanoporous metal membranes.

2. Background of the Related Art

It is known that it is possible to de-alloy a metal alloy by removing a component of the metal alloy through chemical or chemical/electrical means. For example, ancient metal gilders used de-alloying to reduce the cost of gold gilding through a method known as depletion gilding. Depletion gilding was used to selectively remove the non-gold element from a gold alloy statue to leave a thin layer of pure gold on the statue's surface. Such a method allowed the metal gilder to use a less expensive metal of which gold was one component, yet create a nearly pure gold surface.

One example of de-alloying silver-gold alloys is disclosed in U.S. Pat. No. 4,977,038 to Sieradzki et al (hereinafter "Sieradzki"). Sieradzki teaches a method of electrolytic de-alloying. Starting with a gold-silver metal alloy, Sieradzki teaches removing the silver by electrochemical de-alloying to leave a gold structure.

According to Sieradzki, the gold-silver metal alloy is placed in an electrolytic bath which has a high solubility for silver. By applying an electric potential between the metal alloy and a counterelectrode immersed elsewhere in the bath, the silver is selectively dissolved out while leaving the more noble gold. Sieradzki further teaches that the mechanical rigidity of the gold structure can be enhanced by heat annealing after de-alloying.

The above reference is incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the invention is to provide porous membranes and methods to create porous membranes.

Another object of the invention is to provide a method to create nanoporous metal membranes.

Another object of the invention is to provide a method to create nanoporous gold membranes.

Another object of the invention is to provide a method to create nanoporous membranes from a metal alloy.

Another object of the invention is to provide a method to create a nanoporous membrane from a gold-silver metal alloy.

In order to achieve at least the above objects in whole or in part, there is provided a method for selectively removing a component of an alloy by suspending the alloy on the surface of a de-alloying medium configured to dissolve the component.

To further achieve at least the above objects in whole or in part, there is provided a method to fabricate free-standing nanoporous metal membranes with thicknesses on the order of 100 nanometers, and porosity characterized by ligaments on the order of 10 nm diameter spaced 10 nm apart, with a surface area of approximately 10 $m^2$ per gram of nanoporous metal membrane. The membranes are made by selective dissolution of silver from gold-silver metal leaf by supporting the leaf on nitric acid, with the acid serving to dissolve silver from the membrane. Such membranes have extremely high surface areas, and are readily attached (gilded) to many different surfaces, including metals, polymers, and ceramics.

To further achieve at least the above objects in whole or in part, there is provided a method for fabricating a free-standing nanoporous metal membrane which begins with a thin metal leaf with a composition of 50% silver and 50% gold by weight. The metal leaf may be initially supported by tissue paper. Typical thicknesses of the metal leaf include a range of about 100–500 nm, although the particular thickness may vary. The metal leaf may be transferred from the tissue paper to a glass slide by first wetting the slide and then pressing the slide to the metal leaf at which point the tissue paper may be separated from the metal leaf. Upon submersion of the glass slide into a bath of de-alloying medium, the metal leaf at least partially de-adheres from the glass slide, and the de-adhered portion is supported upon the surface of the de-alloying medium. When the de-alloying process is complete, the metal leaf can be removed from the de-alloying medium and re-adhered to the glass slide by reversing the submersion process.

To further achieve at least the above objects in whole or in part, there is provided a method for selectively removing a single metal constituent from a metal alloy by supporting the metal alloy on the surface of a de-alloying medium configured to dissolve the single metal constituent.

To further achieve at least the above objects in whole or in part, there is provided a method for selectively removing a single metal constituent from a metal alloy by supporting the metal alloy on the surface of a de-alloying medium configured to dissolve the single metal constituent, and passing an electrical current between the metal alloy through the de-alloying medium to a counterelectrode immersed elsewhere in the de-alloying medium.

To further achieve at least the above objects in whole or in part, there is a provided a method for selectively removing the silver from a gold-silver alloy by supporting a thin leaf of the gold-silver alloy on the surface of a de-alloying medium configured to selectively dissolve silver.

To further achieve at least the above objects in whole or in part, there is provided a method for making a nanoporous membrane by selectively removing the silver from a gold-silver alloy by supporting a thin leaf of the gold-silver alloy on the surface of a de-alloying medium configured to selectively dissolve silver.

A first embodiment of the present invention is directed to a method for forming a nanoporous metal membrane, including providing metal leaf comprising first and second metals supported on a substrate, and contacting at least a portion of said metal leaf with a de-alloying medium for a time effective to dissolve at least a portion of said one of said first and second metals thereby forming pores in said metal leaf, wherein said at least a portion of said metal leaf is freely supported on said de-alloying medium.

A second embodiment of the present invention is directed to a method of forming a free-standing nanoporous metal membrane, including adhering metal leaf comprising first and second metals to a substrate, de-adhering a portion of said metal leaf from said substrate, and contacting said de-adhered portion of said metal leaf with a de-alloying medium for a time effective to form pores in said metal leaf.

A third embodiment of the present invention is directed to a method for forming a nanoporous metal membrane including adhering metal leaf comprising first and second metals onto the surface of a substrate, contacting said metal leaf and said substrate with a de-alloying medium such that at least a portion of said metal leaf is de-adhered from said substrate and said de-adhered portion is freely supported on said de-alloying medium, and allowing said de-adhered portion of said metal leaf to contact said de-alloying medium for a time effective to dissolve at least a portion of said metal leaf.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A. Definitions

As used herein, the term "to de-alloy" is intended to mean that metal leaf has been contacted with a de-alloying medium for a sufficient amount of time to remove a metal constituent from the metal leaf and form a nanoporous metal membrane. Such nanoporous metal membranes include a microporous structure exhibiting pore sizes on the order of a few nanometers to greater than about 50 nm.

As used herein the term "metal leaf" is intended to mean a thin sheet of a metal alloy. Metal leaf typically has a thickness on the order of from less than 50 nm to greater than 500 nm. The alloy making up the metal leaf may include two or more metal constituents.

B. Preferred Embodiments

In a first preferred embodiment of the present invention, a nanoporous metal membrane may be formed by contacting metal leaf with a de-alloying medium for a time effective to de-alloy the metal leaf. The metal leaf from which the nanoporous metal membrane is formed is an alloy of at least two different metals. Any combination of metals can be used to form the alloy, provided that the chemical properties of the metals are sufficiently different to allow de-alloying. Examples of suitable alloys include, but are not limited to, alloys containing gold, silver, palladium, platinum, zinc, aluminum, nickel, copper, and the like. Non-limiting examples of alloys which may be de-alloyed according to the present invention include gold-silver, gold-copper, zinc-copper, platinum-copper, nickel-aluminum, and copper-aluminum alloys. For instance, for copper-aluminum and nickle-aluminum alloys, aluminum may be removed during de-alloying leaving a nanoporous metal membrane of copper and nickel, respectively.

According to one embodiment of the present invention, the metal leaf preferably has a thickness of from about 50 nm to about 500 nm, more preferably about 100 nm to about 300 nm and even more preferably about 150 nm to about 250 nm. In preferred embodiments of the present, the metal leaf has a thickness of about 250 nm, more preferably about 100 nm.

According to one embodiment of the present invention, the metal alloy may include varying percentages of the constituent metals. For example, in the case of gold-silver alloys, the metal leaf preferably includes about 30%–80% silver by weight and the balance gold. More preferably, the alloy includes gold and silver in an amount of about 50 wt. % gold to about 50 wt. % silver. The metal alloy is preferably in the form of a thin sheet or leaf, and more preferably is a metal leaf produced by cold working, such as by beating. For instance, gold-silver metal leaf may be obtained from commercial sources, such as Sepp Leaf Products, Inc. or Wehrung and Billmeier, in varying thicknesses and gold-silver ratios.

Figure 1:
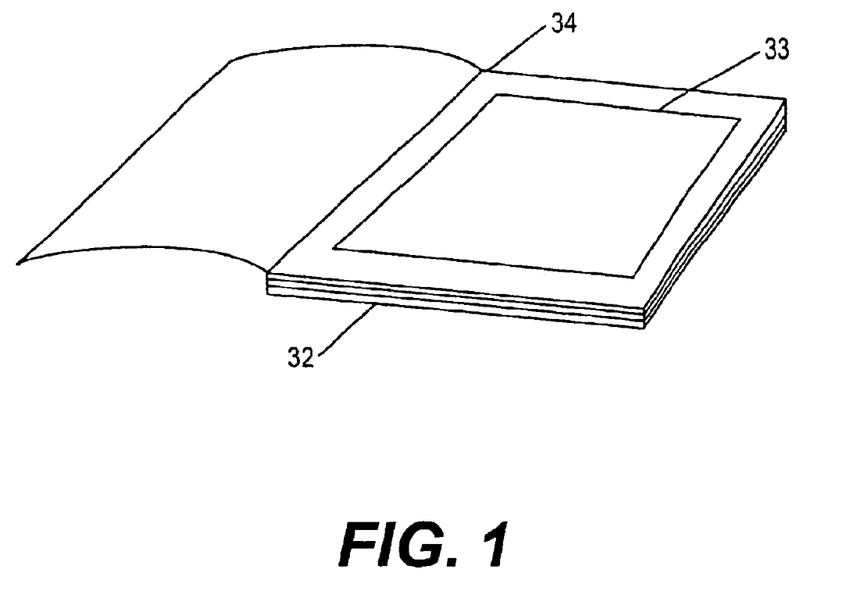
FIG. 1 shows patent leaf stored in a book.

In certain preferred embodiments of the present invention, the metal leaf is provided on a support, such as tissue paper. For instance, as shown in FIG. 1, gold-silver leaf 30 is provided in a book 32 with tissue paper 34 separating sheets of the leaf 30.

The de-alloying medium is a material capable of selectively dissolving at least one of the metal constituents of the metal alloy. Thus, the composition of the de-alloying medium depends on the metal alloy to be de-alloyed. Where the metal alloy includes more than two constituents, the de-alloying medium may be configured to dissolve more than one of the constituents. Preferably, the de-alloying medium is an acid. Acids suitable for practicing the present invention include organic acids and inorganic acids. Preferably, the acid is an inorganic acid, and more preferably a mineral acid, such as nitric acid, sulfuric acid, or hydrochloric acid. In certain preferred embodiments of the present invention, the acid is nitric acid or perchloric acid. Most preferably, the acid is nitric acid. A single acid or a mixture of acids may be used.

The de-alloying medium may be concentrated or diluted. Preferably, the de-alloying medium is a concentrated acid. In certain preferred embodiments of the present invention, the de-alloying medium is an acid and has a concentration of at least about 1 molar, more preferably at least about 5 molar, still more preferably at least about 10 molar and still even more preferably at least about 17 molar. In a preferred embodiment of the present invention, the de-alloying medium is concentrated nitric acid.

According to one embodiment of the present invention, the de-alloying medium may be maintained at ambient temperature, at a temperature above ambient temperature or at a temperature below ambient temperature. Generally, it has been found that, according to the embodiments of the present invention, the de-alloying process proceeds more quickly at elevated temperatures and more slowly at reduced temperatures, relative to ambient. Suitable temperatures may be determined empirically by one having ordinary skill in the art.

Due to the fragile nature of the starting metal leaf and the resulting nanoporous metal membrane, at least a portion of the metal leaf is preferably supported on a substrate before, during and/or after de-alloying. In certain preferred embodiments of the present invention, the substrate is in the form of a planar sheet. Alternatively, according to other preferred embodiments of the present invention, the substrate may have a non-planar shape, such as convex, concave, spherical, cylindrical, rippled, etc. Preferably, the substrate is cylindrical or rod shaped. More preferably, the substrate is, a graphite rod.

According to one embodiment of the present invention, the substrate may be made from a variety of materials. For example the substrate may be made from materials such as glass, ceramic, non-soluble metals, graphite, rubber, nylon and other polymeric materials. Any material may function as the supportive substrate as long as the metal leaf can be adhered and de-adhered to and from the substrate, and, preferably, the substrate is reasonably unreactive with and non-soluble in the de-alloying medium. In certain preferred embodiments of the present invention, the substrate is a conductor or an insulator. In other preferred embodiments of the present invention, the substrate is smooth and nonporous, or otherwise resistant to absorbing the de-alloying medium or other liquids. According to one embodiment of the present invention, the supportive substrate may be treated with materials that affect adhering and de-adhering of the metal leaf, such as release agents that reduce or dissipate electrostatic charge and other agents that increase adherence of the metal leaf to the substrate. In other preferred embodiments of the present invention, the substrate may be polished or ground prior to use in order, for instance, to remove surface irregularities.

In another preferred embodiment of the present invention, the metal leaf is entirely freely supported on the de-alloying medium. In one preferred embodiment of the present invention, the metal leaf is de-adhered from the substrate as the substrate is brought into contact with the de-alloying medium. For instance, the metal leaf may be de-adhered from the substrate by inserting the substrate into the de-alloying medium, whereby the metal leaf detaches from the substrate as the substrate enters the de-alloying medium. After de-alloying is complete, the metal leaf is preferably re-adhered to the substrate by withdrawing the substrate from the de-alloying medium.

According to one embodiment of the present invention, nanoporous metal membranes of various thicknesses may be produced. The thickness of the nano-porous membrane is dependent on the thickness of the metal leaf employed. Preferably, the nanoporous metal membrane has a thickness of less than about 500 nm, more preferably less than about 250 nm and even more preferably less than about 100 nm. Most preferably, the metal membrane has a thickness of about 100 nm.

The nanoporous metal membranes formed according to the methods of the present invention typically have pore sizes ranging from about 3 nm to about 25 nm, more preferably about 5 nm to about 15 nm and still more preferably about 10 to about 15 nm. Most preferably the nanoporous metal membranes have a pore size of about 10 nm.

The nanoporous metal membranes formed according to the methods of the present invention typically have ligaments of about 2 nm to about 25 nm in diameter, more preferably about 5 nm to about 20 nm and still more preferably about 10 nm to about 15 nm. Most preferably the ligaments are about 10 nm.

The nanoporous metal membranes produced according to the methods of the present invention exhibit high surface areas. For example, surface areas on the order of about 10 $m^2/g$ may be achieved.

Figure 2:
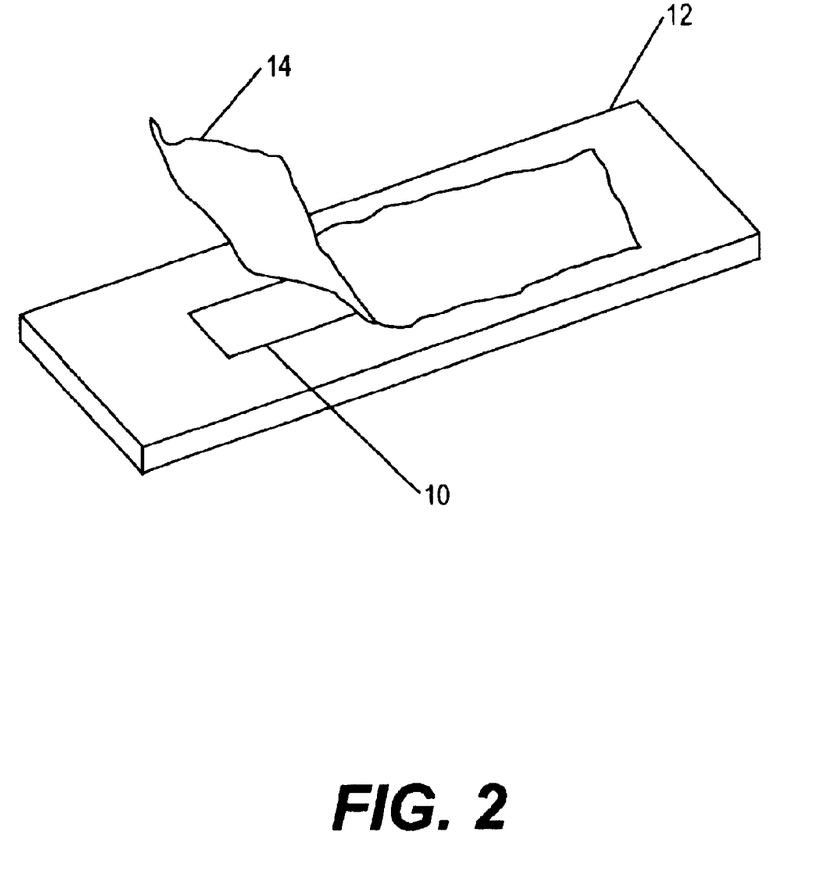
FIG. 2 shows a metal leaf supported on a substrate.

A preferred embodiment of the present invention is shown in FIG. 2. A metal leaf 10 is shown adhered to a substrate 12, with a material supporting the metal leaf 14 being pulled away. The metal leaf 10 is adhered to the substrate 12 to simplify handling of the metal leaf 10 during de-alloying. In preferred embodiments of the present invention, the substrate is a conductor configured to provide electrical contact to the metal leaf 10. According to such embodiments, an electrical current may be passed across the metal leaf 10 by positioning a counter electrode in the de-alloying medium.

Figure 3:
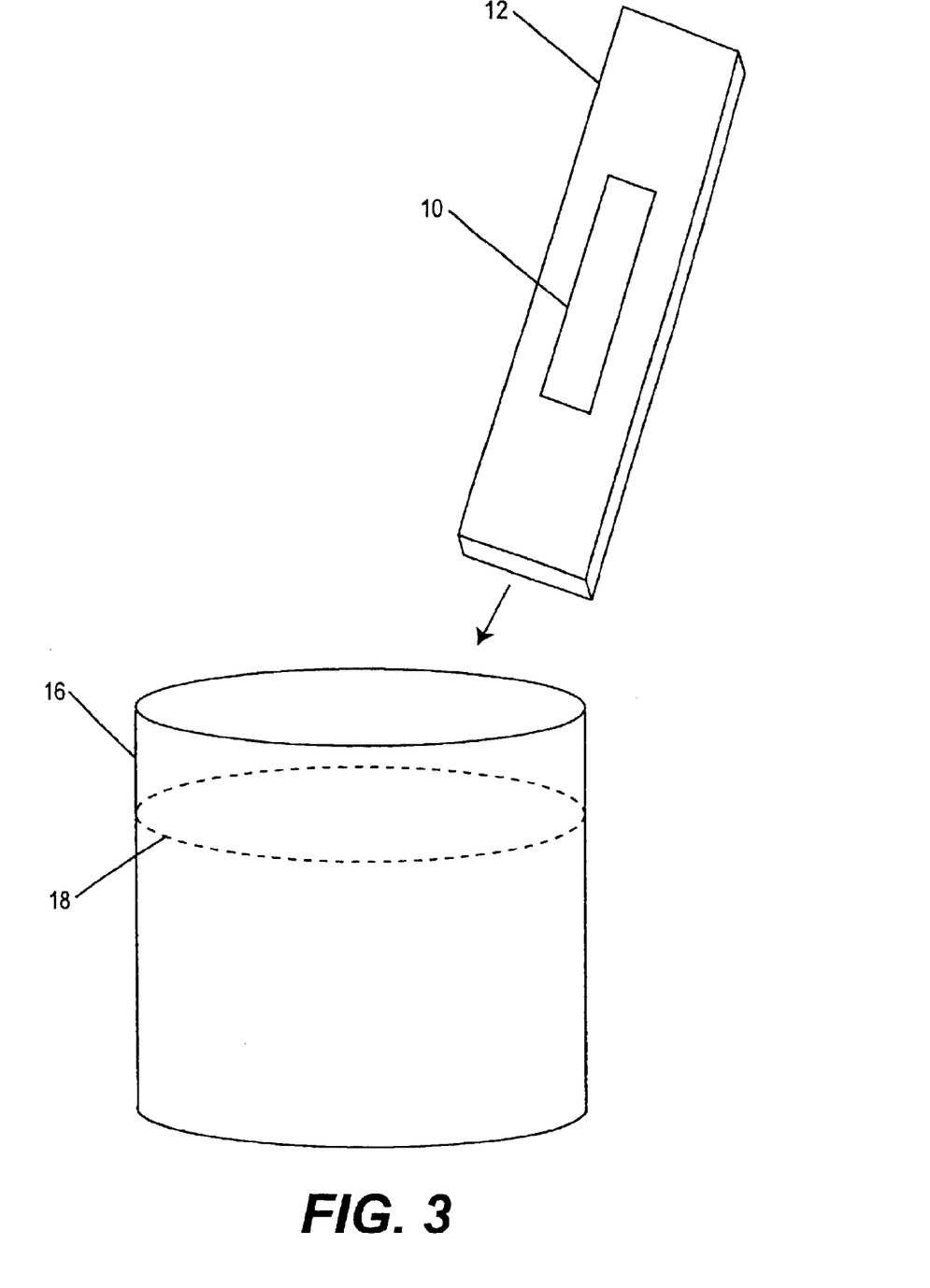
FIG. 3 shows a rigid substrate with adhered metal alloy leaf being inserted into a de-alloying medium according to one embodiment of the present invention.
Figure 4:
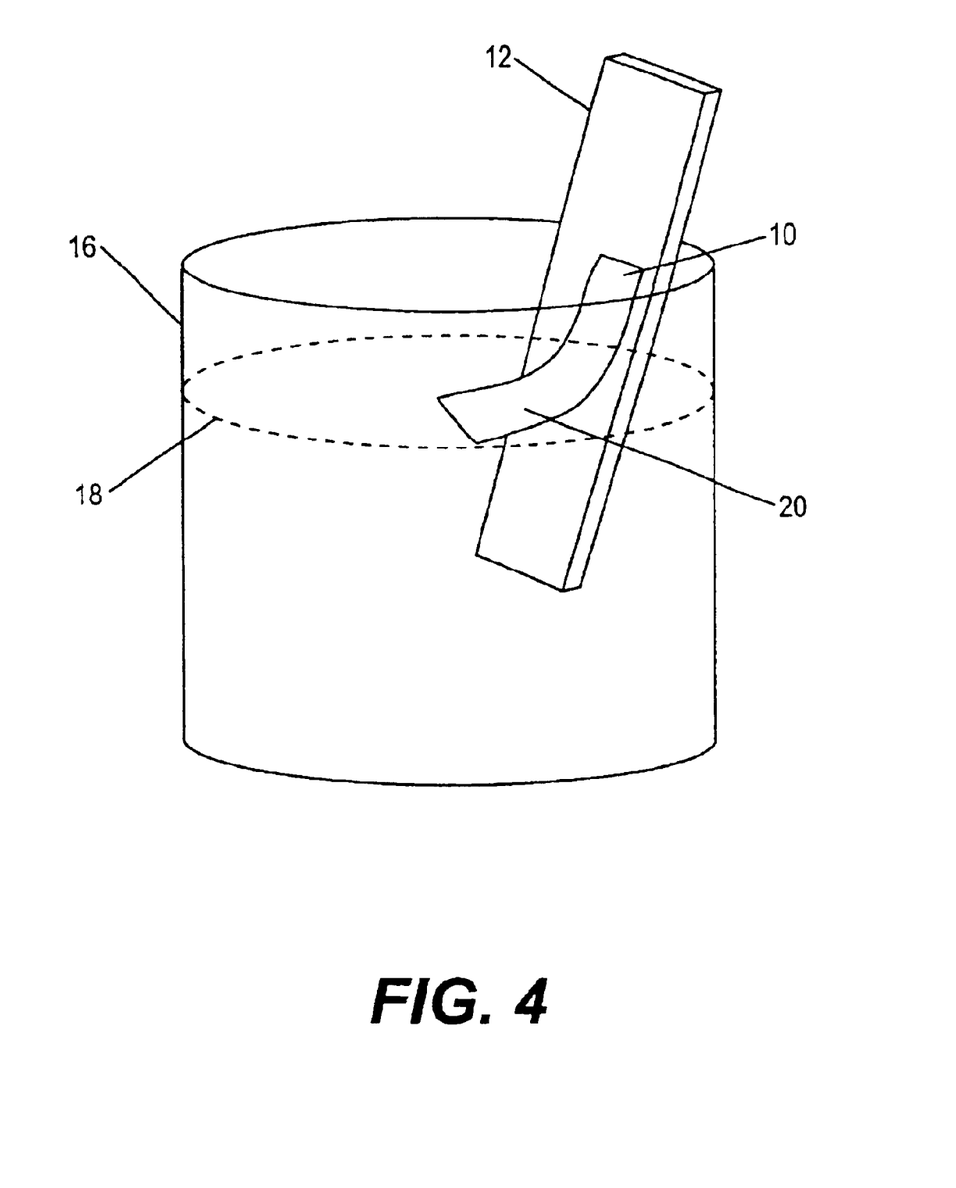
FIG. 4 shows a metal alloy leaf supported on the surface of a de-alloying medium according to the present invention.

Referring to FIG. 3, a substrate 12 with metal leaf 10 adhered thereto is inserted into a de-alloying medium 18 held in a container 16. As shown in FIG. 4, as the substrate 12 is inserted into the de-alloying medium 18, the metal leaf 10 de-adheres from the glass substrate 12 and the de-adhered portion of the metal leaf 20 is freely supported on the de-alloying medium 18.

Figure 5:
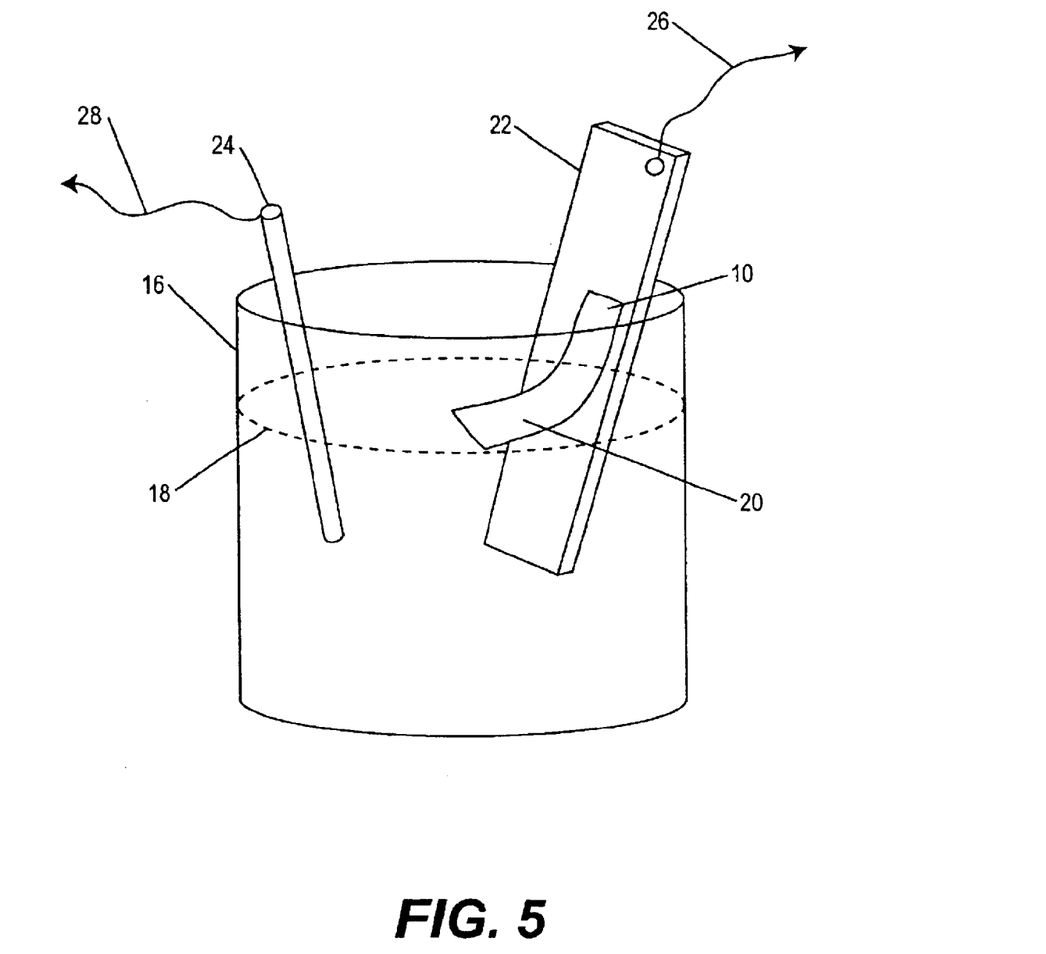
FIG. 5 shows applying a voltage between a metal alloy leaf and a de-alloying medium according to the present invention.

A preferred embodiment of the present invention in shown in FIG. 5. FIG. 5 shows a metal leaf 10 partially adhered to a conductive substrate 22. The conductive substrate 22 is inserted into the de-alloying medium 18, thereby allowing the metal leaf 10 to partially de-adhere from the conductive substrate 22. The de-adhered portion of the metal leaf 20 is freely supported on the surface of the de-alloying medium 18. In addition to the conductive substrate 22, a second conductor 24 is inserted into the de-alloying medium 18. Both the conductive substrate 22 and the second conductor 24 are attached to electrical conductors 26 and 28, respectively.

The arrangement in FIG. 5 allows the de-alloying process to be enhanced or controlled by causing an electrical current to flow between the metal leaf 10 and the de-alloying medium 18. By applying a voltage, the pore size of the resulting nanoporous metal membrane can be controlled. For example, it has been found that applying a voltage during de-alloying produces a nanoporous metal membrane with finer pores than one created without applying a voltage.

Preferably, the voltage is between about 0.8V and about 1.2V, more preferably about 1.0V. Additionally, depending on the electrical nature of the de-alloying medium 18 and the metal leaf 10, it may be preferable to cause the metal leaf 10 to be the anode, or the cathode, or alternate between the anode and cathode during the de-alloying process. Suitable voltages can be determined empirically by one of ordinary skill in the art using methods and techniques known in the art.

According to certain preferred embodiments of the present invention, the pore structure of the nanoporous metal membrane may be coarsened by leaving the porous membrane in contact with the de-alloying medium after de-alloying. Suitable times may be determined empirically by one having ordinary skill in the art.

Figure 6:
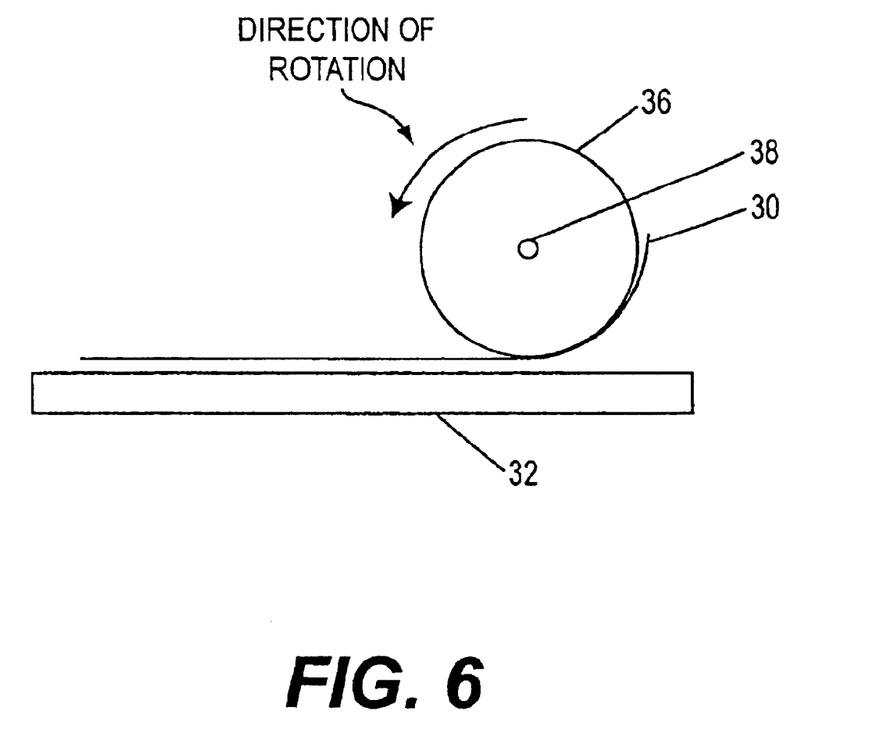
FIG. 6 shows adhering a metal leaf from a book onto a rod according to one embodiment of the present invention.

According to another preferred embodiment of the present invention, metal leaf is de-alloyed using a graphite rod as a substrate. As shown in FIG. 6, metal leaf 30 is adhered to a graphite rod 36 by rolling the graphite rod 36 over the metal leaf 30. Preferably, the length of the graphite rod 36 is greater than the width of the metal leaf 30, so that the metal leaf 30 does not hang over the ends of the graphite rod 30. In certain preferred embodiments of the present invention, the graphite rod 36 has a diameter of about 2 inches and a length of about 4 inches. Preferably, the graphite rod is wetted and at least partially dried prior to use.

As shown in FIG. 6, the graphite rod has arms 38 extending from each end of the graphite rod. The arms 38 may be formed as a continuous piece of the rod 36, for instance by turning on a lathe to from a monolithic body, or may be inserted into or otherwise attached to the rod 36, for instance by adhesive bonding or other methods known in the art. The arms 38 may be formed of the same material as the rod 36 or of a different material than the rod 36. Examples of suitable materials include, but are not limited to, metals, plastics, teflon, ceramics, other polymeric materials and the like. For instance, screws or dowels may be attached to the rod 36 by methods known in the art, thereby forming arms 38. In a preferred embodiment of the present invention, the arms 38 may be supported on the edge of a container holding a liquid, such as water or de-alloying medium, and allow for easy de-adhering and re-adhering of the metal leaf 30 to and from the graphite rod 36 during the de-alloying process.

Figure 7:
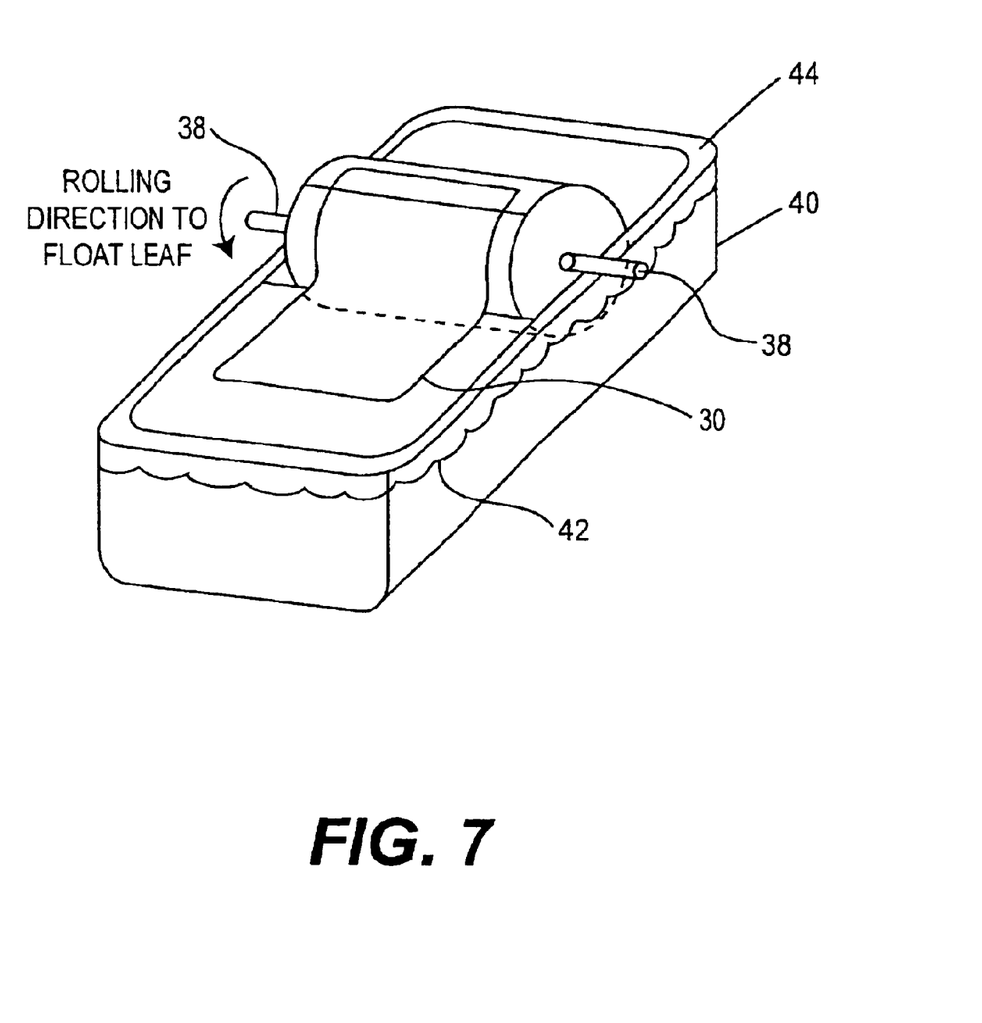
FIG. 7 shows de-adhering a metal leaf onto the surface of a liquid bath according to one embodiment of the present invention.

Preferably, the metal leaf is floated on water prior to de-alloying. This allows any wrinkles in the metal leaf to be smoothed out and, additionally, forms a water layer on both the metal leaf 30 and the graphite rod 36. According to such embodiments, as shown in FIG. 7, a container 40 having dimensions such that arms 38 rest on the edge 44 of the container 40 is filled with water. Preferably, the container is filled with water to an extent such that the rod 36 is submerged almost up to the bottom of the arms 38. The rod 36 is then rolled along the length of the container 40 and the metal leaf 30 is de-adhered from the graphite rod 36 and is floated on the surface of the water 42. The rod 36 may either be left on the edge of the container 44 or removed therefrom.

The metal leaf 36 may be re-adhered to the rod by rolling the rod 36 along the edge 44 of the container 40. Preferably, the rod 36 is tolled in the opposite direction along the edge 44 of the container that it was rolled to de-adhere the metal leaf 30. If the graphite rod 36 was removed after de-adhering the metal leaf, it is repositioned on the edge 44 of the container 40 prior to re-adhering the metal leaf 30 to the graphite rod 36.

While FIG. 7 illustrates an embodiment wherein the container is filled nearly to the top with water, the container need only be filled to such a level that at least a portion of the graphite rod contacts the water, thereby allowing the metal leaf to be de-adhered from the graphite rod. Additionally, the dimension of the container are dependent upon the dimensions of the rod and may be determined empirically by one having ordinary skill in the art. While the container shown in FIG. 7 is rectangular in shape, other geometries, such as square, may be used. Such geometries may readily be determined empirically by one having ordinary skill in the art. Preferably, the container is glass.

According to a preferred embodiment of the present invention, the wetted metal leaf is then transferred to a container holding a de-alloying medium, as described above with respect to the water bath. The metal leaf is allowed to contact the de-alloying medium for a time effective to de-alloy the metal leaf. The amount of time necessary is dependent upon, among other things, the metal alloy of the metal leaf and may be determined empirically by one having ordinary skill in the art. For instance, it has been found according to one embodiment of the present invention, that a 50 wt. % silver/50 wt. % gold leaf is de-alloyed on concentrated nitric acid under free corrosion conditions, i.e., a voltage is not applied, in approximately 5 minutes. The resultant pore size is approximately 20 nm.

In another preferred embodiment of the present invention, a voltage is applied between the graphite rod and a counterelectrode during de-alloying. According to this embodiment, a portion of the metal leaf is left adhered to the graphite rod. In addition to the graphite rod, a second conductor is inserted into the de-alloying medium. Both the graphite rod and the second conductor are attached to electrical conductors which are configured to provide a voltage potential between the graphite rod and the second conductor. By applying such a voltage, the pore size of the resulting nanoporous metal membrane can be controlled. For instance, de-alloying of 50 wt. % silver/50 wt. % gold leaf may be carried out in approximately 15 seconds, with a resultant pore size of approximately 5 nm. Suitable voltages may be determined empirically by one having ordinary skill in the art. Preferably, the voltage ranges from about 0.8 V to about 1.2 V, more preferably about 1.0 V.

Once the metal leaf is de-alloyed, either with or without applying a voltage, the resultant nanoporous membrane is re-adhered to the graphite rod by rolling the rod along the edges of the container. The nanoporous metal membrane may then be washed in water or another solvent, as described above with respect to floating the metal leaf on water. Preferably, the nanoporous metal membrane is washed in a water bath. More preferably, the nanoporous metal membrane is washed a plurality of times in successive water or solvent baths. According to a preferred embodiment, the nanoporous metal membrane is washed in a first water bath for about 5 minutes and subsequently washed in a second water bath for about 20 minutes. Suitable times may be determined empirically by one having ordinary skill in the art.

EXAMPLES

Example 1

In this example, gold leaf was de-alloyed using a graphite rod to float the metal on the surface of concentrated nitric acid.

12 carat gold leaf (manufactured by Monarch and purchased from Sepp Leaf Products) was transferred to a polished graphite rod (polished on a lathe to 1200 grit) having arms extending from the ends thereof by rolling the rod over the leaf. The gold leaf was then unrolled onto concentrated nitric acid by rolling the arms of the rod along the edges of a container holding concentrated nitric acid. The gold leaf was left freely supported on the concentrated nitric acid for approximately 5 minutes, resulting in a color change from silver to reddish gold.

The de-alloyed gold leaf (nanoporous metal membrane) was re-adhered to the graphite rod by rolling the rod over the nanoporous metal membrane along the edges of the container and transferred, in the same manner, to a first bath containing distilled water. After about 5 minutes, the nanoporous metal membrane was transferred to a second bath containing distilled water using a nylon roller. The nanoporous metal membrane was allowed to contact the second bath for approximately 20 minutes.

Figure 8:
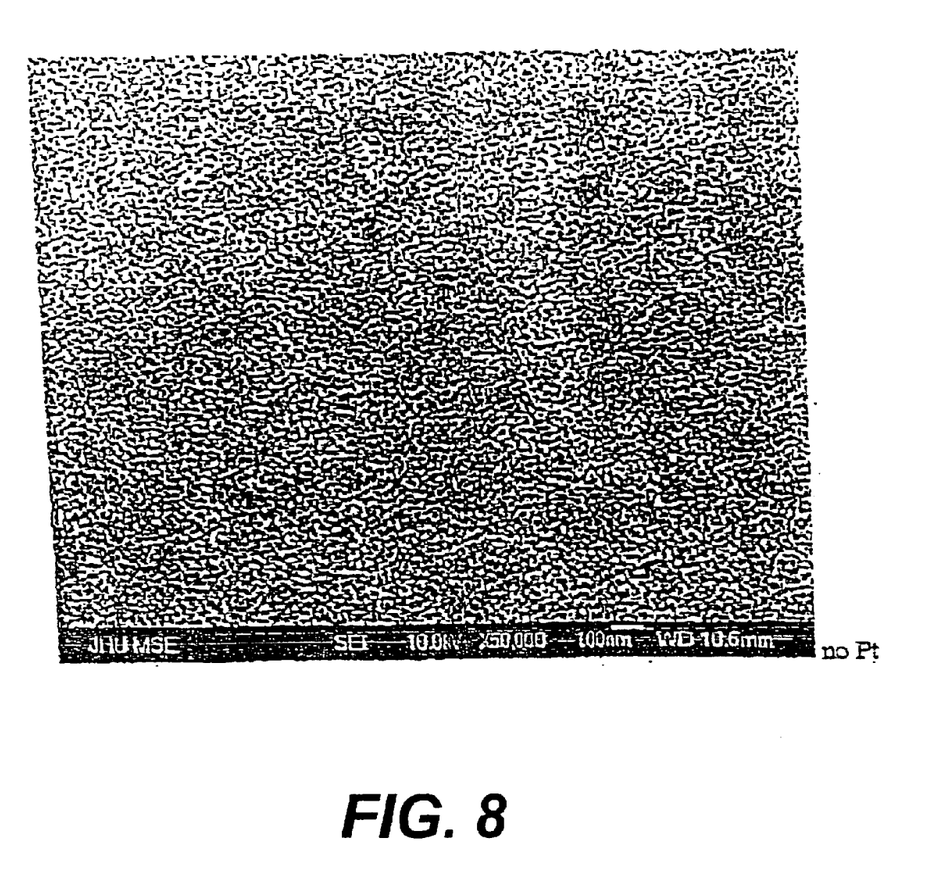
FIG. 8 shows a SEM photograph of a nanoporous gold membrane made according to the methods of the present invention.

A SEM photograph of the nanoporous gold membrane is shown in FIG. 8.

Example 2

In this example, 12 karat gold leaf was de-alloyed using a planar glass substrate.

A glass slide was rinsed with distilled water. The slide was partially dried by patting with a KimWipe™. The slide was contacted with a 12 carat gold leaf sheet supported on tissue paper (Wehrung and Billmeier). The gold leaf was floated on the surface of concentrated nitric acid by orienting the slide vertically to the surface of the acid and slipping the slide into the acid. The gold leaf was allowed to contact the acid for about 5 minutes and the slide was withdrawn from the acid, resulting in a nanoporous gold membrane.

Having now fully described this invention, it will be understood to those of ordinary skill in the art that the methods of the present invention can be carried out with a wide and equivalent range of conditions, formulations and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method for forming a nanoporous metal membrane, which comprises:
   providing metal leaf comprising first and second metals supported on a substrate; and
   de-alloying said metal leaf by contacting at least a portion of said metal leaf with a de-alloying medium for a time effective to form a nanoporous metal membrane, wherein said at least a portion of said metal leaf is freely supported by said de-alloying medium and said nanoporous metal membrane comprises pores having a pore size of a few nanometers to about 50 nm.

2. The method according to claim 1, wherein said substrate is a rod or cylinder.

3. The method according to claim 1, wherein said substrate comprises an insulator or a conductor.

4. The method according to claim 1, wherein said substrate comprises a member selected from the group consisting of graphite, glass, nylon, ceramic and combinations thereof.

5. The method according to claim 1, wherein said substrate comprises a graphite rod.

6. The method according to claim 1, further comprising applying an electric potential while said metal leaf is in contact with said de-alloying medium.

7. The method according to claim 6, wherein the electric potential ranges from approximately 0.8V to approximately 1.2V.

8. The method according to claim 6, wherein said electric potential is about 1.0 V.

9. The method according to claim 1, wherein said first metal is gold.

10. The method according to claim 9, wherein said second metal is silver.

11. The method according to claim 1, wherein said metal leaf is 12 karat silver-gold leaf.

12. The method according to claim 1, wherein said medium comprises nitric acid.

13. The method according to claim 1, wherein said medium comprises concentrated nitric acid.

14. The method according to claim 1, further comprising re-adhering at least a portion of said nanoporous metal membrane to said substrate following de-alloying.

15. The method of claim 1, wherein substantially all of said metal leaf is freely supported by said de-alloying medium.

16. The method according to claim 1, wherein at least a portion of said metal leaf is not de-adhered from said substrate.

17. The method according to claim 1, wherein said metal leaf comprises about 50 wt. % gold and about 50 wt. % silver.

18. The method according to claim 1, wherein said de-alloying medium is at approximately ambient temperature.

19. A method for forming a nanoporous metal membrane, comprising:
   adhering metal leaf comprising first and second metals onto the surface of a substrate;
   contacting said metal leaf and said substrate with a de-alloying medium such that at least a portion of said metal leaf is de-adhered from said substrate and said de-adhered portion is freely supported on said de-alloying medium; and
   allowing said de-adhered portion of said metal leaf to contact said de-alloying medium for a time effective to de-alloy said metal leaf, thereby forming a nanoporous metal membrane, wherein said nanoporous metal membrane comprises pores having a pore size of a few nanometers to about 50 nm.

20. The method according to claim 19, wherein said substrate is a rod or cylinder.

21. The method according to claim 19, wherein said substrate comprises an insulator or a conductor.

22. The method according to claim 19, wherein said substrate comprises a member selected from the group consisting of graphite, glass, nylon, ceramic and combinations thereof.

23. The method according to claim 19, wherein said substrate comprises a graphite rod.

24. The method according to claim 19, further comprising applying an electric potential while said metal leaf is in contact with said de-alloying medium.

25. The method according to claim 24, wherein the electric potential ranges from approximately 0.8V to approximately 1.2V.

26. The method according to claim 24, wherein said electric potential is about 1.0 V.

27. The method according to claim 19, wherein said first metal is gold.

28. The method according to claim 27, wherein said second metal is silver.

29. The method according to claim 19, wherein said metal leaf is 12 karat silver-gold leaf.

30. The method according to claim 19, wherein said medium comprises nitric acid.

31. The method according to claim 19, wherein said medium comprises concentrated nitric acid.

32. The method according to claim 19, further comprising re-adhering at least a portion of said nanoporous metal membrane to said substrate following de-alloying.

33. The method of claim 19, wherein substantially all of said metal leaf is freely supported by said de-alloying medium.

34. The method according to claim 19, wherein at least a portion of said metal leaf is not de-adhered from said substrate.

35. The method according to claim 19, wherein said metal leaf comprises about 50 wt. % gold and about 50 wt. % silver.

36. The method according to claim 19, wherein said de-alloying medium is at approximately ambient temperature.

37. A method of forming a nanoporous metal membrane, comprising:
   adhering metal leaf comprising first and second metals to a substrate;

de-adhering a portion of said metal leaf from said substrate; and de-alloying said portion of said metal leaf by contacting said de-adhered portion of said metal leaf with a de-alloying medium for a time effective to de-alloy said metal leaf, thereby forming a nanoporous metal membrane, wherein said nanoporous metal membrane comprises pores having a pore size of a few nanometers to about 50 nm.

38. The method according to claim 37, wherein said substrate is a rod or cylinder.

39. The method according to claim 37, wherein said substrate comprises an insulator or a conductor.

40. The method according to claim 37, wherein said substrate comprises a member selected from the group consisting of graphite, glass, nylon, ceramic and combinations thereof.

41. The method according to claim 37, wherein said substrate comprises a graphite rod.

42. The method according to claim 37, further comprising applying an electric potential while said metal leaf is in contact with said de-alloying medium.

43. The method according to claim 42, wherein the electric potential ranges from approximately 0.8V to approximately 1.2V.

44. The method according to claim 42, wherein said electric potential is about 1.0 V.

45. The method according to claim 37, wherein said first metal is gold.

46. The method according to claim 45, wherein said second metal is silver.

47. The method according to claim 37, wherein said metal leaf is 12 karat silver-gold leaf.

48. The method according to claim 37, wherein said medium comprises nitric acid.

49. The method according to claim 37, wherein said medium comprises concentrated nitric acid.

50. The method according to claim 37, further comprising re-adhering at least a portion of said nanoporous metal membrane to said substrate following de-alloying.

51. The method of claim 37, wherein substantially all of said metal leaf is freely supported by said de-alloying medium.

52. The method according to claim 37, wherein at least a portion of said metal leaf is not de-adhered from said substrate.

53. The method according to claim 37, wherein said metal leaf comprises about 50 wt. % gold and about 50 wt. % silver.

54. The method according to claim 37, wherein said de-alloying medium is at approximately ambient temperature.

55. The method according to claim 37, wherein said portion is de-adhered from said substrate by introducing said substrate with said metal leaf adhered thereto into said de-alloying medium.

56. A nanoporous metal membrane made according to the method of claim 1.

57. A nanoporous metal membrane comprising a metal, wherein said nanoporous metal membrane has a thickness of about 50 nm to about 500 nm, a surface area of at least about 10 m$^2$/g and comprises pores having a pore size of a few nanometers to about 50 nm.

58. The nanoporous metal membrane according to claim 57, wherein said metal is gold.

59. The nanoporous metal membrane according to claim 57, wherein said nanoporous metal membrane comprises pores ranging in size from about 3 nm to about 25 nm.

60. The nanoporous metal membrane according to claim 57, wherein said nanoporous metal membrane comprises pores ranging in size from about 5 nm to about 15 nm.

61. The nanoporous metal membrane according to claim 57, wherein said nanoporous metal membrane comprises pores of about 10 nm.

62. The nanoporous metal membrane according to claim 57, wherein said nanoporous metal membrane has a thickness of less than about 500 nm.

63. The nanoporous metal membrane according to claim 57, wherein said nanoporous metal membrane has a thickness of less than about 250 nm.

64. The nanoporous metal membrane according to claim 57, wherein said nanoporous metal membrane has a thickness of less than about 100 nm.

65. A nanoporous metal membrane comprising a metal, wherein said nanoporous metal membrane comprises pores having a pore size of a few nanometers to about 50 nm and ligaments of about 2 nm to about 25 nm.

66. The nanoporous metal membrane according to claim 65, wherein said nanoporous metal membrane comprises ligaments of about 10 nm in diameter.

67. The nanoporous metal membrane according to claim 66, wherein said ligaments are spaced about 10 nm apart.

* * * * *